(12) United States Patent
Huang et al.

(10) Patent No.: US 9,591,034 B2
(45) Date of Patent: Mar. 7, 2017

(54) METHOD AND GATEWAY DEVICE FOR MANAGING ADDRESS RESOURCE

(71) Applicant: HUAWEI TECHNOLOGIES CO., LTD., Shenzhen, Guangdong (CN)

(72) Inventors: Yong Huang, Shenzhen (CN); Lehong Niu, Shenzhen (CN); Shucheng Liu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 412 days.

(21) Appl. No.: 14/465,263

(22) Filed: Aug. 21, 2014

(65) Prior Publication Data

US 2014/0362870 A1 Dec. 11, 2014

Related U.S. Application Data

(63) Continuation of application No. PCT/CN2012/086988, filed on Dec. 20, 2012.

(30) Foreign Application Priority Data

Feb. 23, 2012 (CN) .......................... 2012 1 0042352

(51) Int. Cl.
*H04L 29/06* (2006.01)
*H04L 12/28* (2006.01)
(Continued)

(52) U.S. Cl.
CPC ........ *H04L 65/102* (2013.01); *H04L 12/2859* (2013.01); *H04L 12/4662* (2013.01);
(Continued)

(58) Field of Classification Search
None
See application file for complete search history.

(56) References Cited

U.S. PATENT DOCUMENTS 5,159,592 A * 10/1992 Perkins ............. H04L 29/12216
370/338
6,988,148 B1 1/2006 Sheth
(Continued)

FOREIGN PATENT DOCUMENTS

CN 1585359 A 2/2005
CN 101741925 A 6/2010
(Continued)

OTHER PUBLICATIONS

Partial English Translation of WO2011134154A1. pp. 4-7 and Figs. 1, 2, 6.*

(Continued)

*Primary Examiner* — Hassan Kizou
*Assistant Examiner* — Ashil Farahmand
(74) *Attorney, Agent, or Firm* — Staas & Halsey LLP

(57) ABSTRACT

Embodiments of the present invention disclose a method and a gateway device for managing an address resource, which relate to the field of Internet technologies and can maximally reduce horizontal traffic between gateway devices, thereby improving system performance. The method in the present invention includes: sending an address delegation request message to a management gateway device in a same gateway group, where the management gateway device is configured to manage an address pool(s) or an address in an address pool; receiving a response message sent by the management gateway device, where the response message includes a delegated address, and the delegated address is an address in the address pool(s) managed by the management gateway device; acquiring the delegated address in the response message; and allocating an address in the delegated address to a user terminal in a same user group. The present invention is used for managing the address resource.

12 Claims, 6 Drawing Sheets

(51) Int. Cl.
*H04L 29/12* (2006.01)
*H04L 12/46* (2006.01)

(52) U.S. Cl.
CPC ...... *H04L 61/2061* (2013.01); *H04L 12/4633* (2013.01); *H04L 61/103* (2013.01); *H04L 61/2015* (2013.01)

(56) References Cited

U.S. PATENT DOCUMENTS

| | | | |
|---|---|---|---|
| 7,788,345 | B1 | 8/2010 | Sukiman et al. |
| 9,480,092 | B2* | 10/2016 | Horn .................. H04W 76/022 |
| 2010/0054222 | A1* | 3/2010 | Rune ................ H04L 29/12066 370/338 |

FOREIGN PATENT DOCUMENTS

| | | |
|---|---|---|
| CN | 101795302 A | 8/2010 |
| CN | 101374160 | 7/2015 |
| EP | 1701516 A1 | 9/2006 |
| EP | 1701516 B1 | 9/2008 |
| WO | WO 2011/134154 A1 | 11/2011 |

OTHER PUBLICATIONS

Office Action mailed Jul. 27, 2015 for Chinese Patent Application No. 201210042352.4.
PCT International Search Report issued on Mar. 14, 2013 in corresponding International Patent Application No. PCT/CN201/086988.
International Search Report mailed Mar. 14, 2013, in corresponding International Patent Application No. PCT/CN2012/086988.
Extended European Search Report dated Dec. 5, 2014 in corresponding European Patent Application No. 12869365.2.
Shen et al., "DHCP Proxy Server Micro-block Allocation Scheme for IP Address Pool Management", Network Working Group, Jan. 2007, pp. 1-10.

* cited by examiner

METHOD AND GATEWAY DEVICE FOR MANAGING ADDRESS RESOURCE

CROSS-REFERENCE TO RELATED APPLICATIONS

This application is a continuation of International Application No. PCT/CN2012/086988, filed on Dec. 20, 2012, which claims priority to Chinese Patent Application No. 201210042352.4, filed on Feb. 23, 2012, both of which are hereby incorporated by reference in their entireties.

TECHNICAL FIELD

The present invention relates to the field of Internet technologies, and in particular, to a method and a gateway device for managing an address resource.

BACKGROUND

With booming development of Internet technologies, the Internet keeps growing in its information transmission capability, and network traffic is rapidly increasing at a compound annual growth rate of 50%. This requires a corresponding network access device to expand its capacity so as to accommodate demands of Internet development. A gateway device is mainly used for access of a home broadband user and an enterprise user to the Internet. With the capacity expansion of the network access device, a network service provider must deploy more gateway devices on a same site. A user's terminal device can be connected to a LAN Switch (aggregation switch) by using a DSLAM (Digital Subscriber Line Access Multiplexer, digital subscriber line access multiplexer), and then the user's terminal device can be connected to a corresponding gateway device via the LAN Switch.

After accepting a connection request of the user's terminal device, the gateway device allocates an address to the user's terminal device, where the address used for allocation comes from an address pool bought by a network operator. Because multiple gateway devices exist on one site, effective management is required for address resources during running processes of the gateway devices so as to ensure stability of each running gateway device and effective utilization of the address pool.

An existing mainstream method for managing an address resource is as follows: After a user's terminal device is connected to a gateway device and allocated with an address and if an address pool in which the address exists does not belong to the gateway device connected the terminal device, a horizontal tunnel is used to implement unity of traffic paths. For example:

The user's terminal device is connected to a gateway device 2, but the address pool in which the allocated address exists belongs to a gateway device 1. For the purpose of the unity of traffic paths, a horizontal tunnel needs to be used between the gateway device 1 and the gateway device 2 to form horizontal traffic, so as to establish the following traffic path:

the user's terminal device-DSLAM-LAN Switch-the gateway device 2-the gateway device 1-CR (Core Router, core router), where the user's terminal device finally accesses the Internet through this traffic path.

In the process of implementing the present invention, the inventor finds that at least the following problem exists in the prior art:

Because many gateway devices exist on a same site and horizontal traffic between the gateway devices is heavy, a large number of ports of the gateway devices need to be occupied to establish horizontal tunnels, thereby causing waste of port resources and system performance deterioration.

SUMMARY

Embodiments of the present invention provide a method and a gateway device for managing an address resource, which can maximally reduce horizontal traffic between gateway devices, so as to improve system performance.

The embodiments of the present invention use the following technical solutions to achieve the foregoing purpose:

According to one aspect, an embodiment of the present invention provides a method for managing an address resource, including:

sending an address delegation request message to a management gateway device in a same gateway group, where the management gateway device is configured to manage an address pool(s) or an address in an address pool;

receiving a response message sent by the management gateway device, where the response message includes a delegated address, and the delegated address is an address in the address pool(s) managed by the management gateway device;

acquiring the delegated address in the response message; and allocating an address in the delegated address to a user terminal in a same user group.

According to another aspect, an embodiment of the present invention provides a gateway device for managing an address resource, including:

a sender, configured to send an address delegation request message to a management gateway device in a same gateway group, where the management gateway device is configured to manage an address pool(s) or an address in an address pool;

a receiver, configured to receive a response message sent by the management gateway device, where the response message includes a delegated address, and the delegated address is an address in the address pool(s) managed by the management gateway device;

an address acquiring module, configured to acquire the delegated address in the response message; and an allocation module, configured to allocate an address in the delegated address to a user terminal in a same user group.

By means of the method and the gateway device for managing an address resource according to the embodiments of the present invention, in a process of allocating an address by the gateway device, a delegated address is allocated only to a user terminal in a same user group, thereby effectively managing and allocating the address resource and reducing occurrence of a situation in which multiple user groups share a same address pool. Therefore, horizontal traffic is reduced, requirements of horizontal tunnels are reduced for the gateway device, port resources between gateway devices are saved, and system performance is improved.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To make advantages of the technical solutions in the present invention clearer, the following describes the present invention in detail with reference to the accompanying drawings and embodiments.

Embodiment 1

Figure 1:
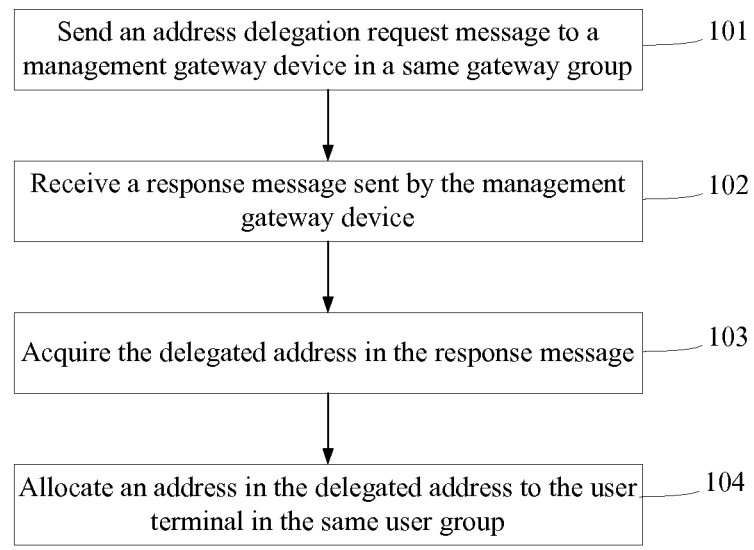
FIG. 1 is a flowchart of a method for managing an address resource according to Embodiment 1 of the present invention.

This embodiment of the present invention provides a method for managing an address resource. As shown in FIG. 1, the method includes:

Step 101: Send an address delegation request message to a management gateway device in a same gateway group.

The management gateway device is configured to manage an address pool(s) or an address in an address pool, and the address delegation request message is used to request the management gateway device to delegate the address pool(s) managed by it or the address in the address pool to a gateway device, which sends the address delegation request message, for management.

In a practical application of the present invention, generally, multiple gateway devices exist in the same gateway group, and the management gateway device may be a gateway device that has a top priority among the multiple gateway devices.

Figure 2:
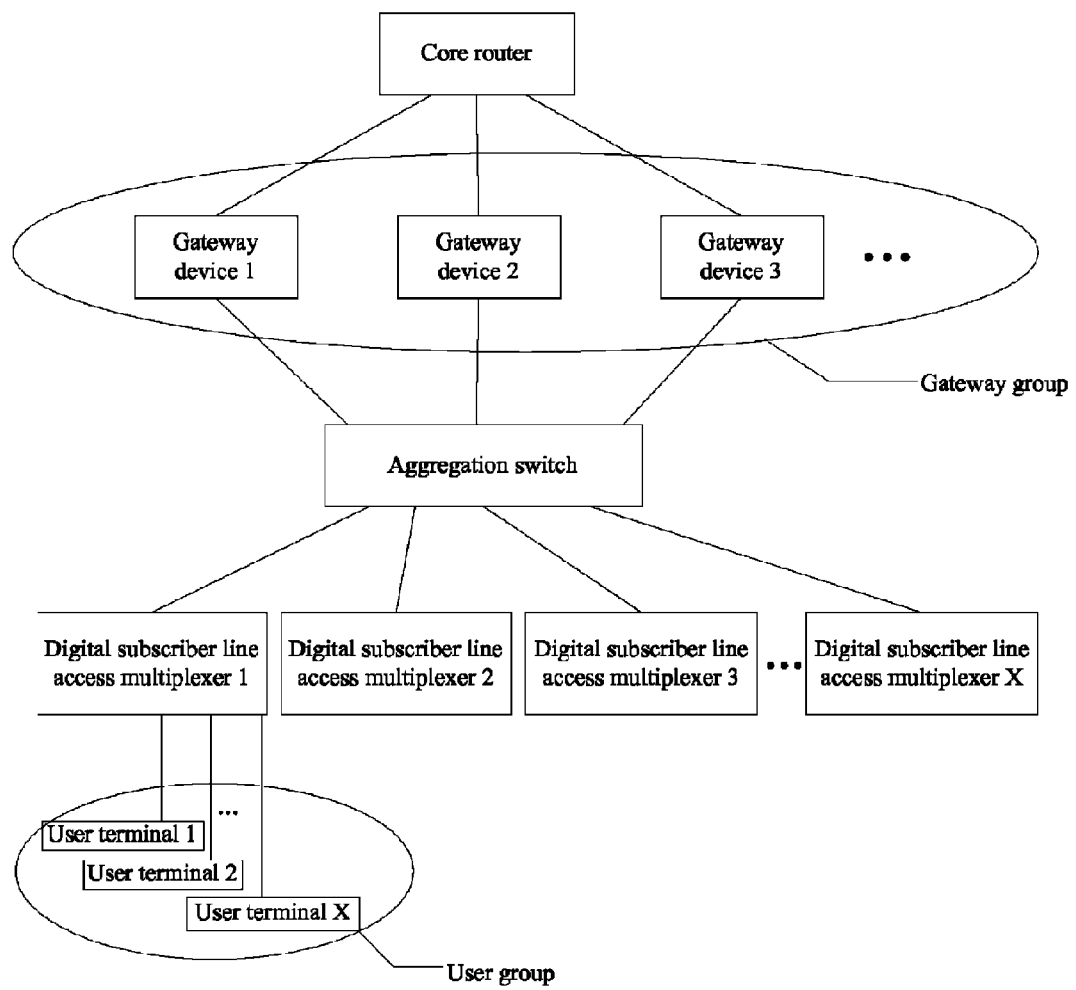
FIG. 2 is a schematic diagram of a network architecture according to an embodiment of the present invention.

In the network architecture illustrated in FIG. 2, a user group formed by multiple user terminals is connected to an aggregation switch through digital subscriber line access multiplexer 1 to which the user group belongs, and then is connected to a corresponding gateway device through the aggregation switch. After the gateway device allocates an address to a user terminal, the user terminal may access the Internet through an upstream device such as a core router according to the address.

The user group may be a set of multiple user terminals having a same access attribute, such as user terminals accessing a network from a same access device or user terminals connected to a same gateway device. A manner of implementing access of a user terminal in the user group to a network is not limited in this embodiment of the present invention and may be any implementation manner familiar to a person skilled in the art. In the gateway group, assuming that the gateway device that has the top priority is the gateway device 1, the gateway device 1 can be considered as the management gateway device in the gateway group.

Step 102: Receive a response message sent by the management gateway device.

The response message includes a delegated address, where the delegated address is the address delegated by the management gateway device to the gateway device, which sends the address delegation request message, for management, and the delegated address is an address in the address pool(s) managed by the management gateway device.

Specifically, in this embodiment, after sending the address delegation request message to the management gateway device, the gateway device receives the response message returned by the management gateway device, where the response message includes the delegated address delegated by the management gateway device to the gateway device, and the delegated address is the address in the address pool(s) managed by the management gateway device, so that the gateway device acquires an address from the response message. Specifically, the delegated address may be all addresses in one address pool or part of addresses in one address pool.

Further, in a practical application of the present invention, in addition to managing the address pool(s) or the address in the address pool, the management gateway device may further allocate an address to a user terminal in a same user group, that is, the management gateway device may further have all functions that any other gateway device in the same gateway group has.

Step 103: Acquire the delegated address in the response message.

Specifically, in this embodiment, the gateway device acquires the delegated address in the response message sent by the management gateway device.

Step 104: Allocate an address in the delegated address to the user terminal in the same user group.

Specifically, in this embodiment, the gateway device allocates the address in the delegated address to the user terminal in the user group. An address in a same address pool is allocated only to a user terminal in a same user group. That is, a delegated address pool corresponds to only one user group, and an address in the address pool is allocated by the gateway device only to a user terminal in the user group. Therefore, the address pool delegated to the gateway device is provided only for one user group at one time, which prevents a situation in which the address in the address pool delegated to the gateway device is allocated to a user terminal in a user group managed by another gateway device, and reduces horizontal traffic generated when the address pool delegated to the gateway device is provided for multiple user groups.

The user group may be a set of multiple users having a same access attribute, such as users accessing a network from a same access device, or users connected to a same gateway device. For example, in an embodiment, packets sent by a same user group to a gateway device are encapsulated using a same sVlan (Service Virtual Local Area Network, service virtual local area network), and therefore the sVlan can be used as a user group identifier. A user group identifier information includes information about the service virtual local area network sVlan, where the sVlan is defined in IEEE 802.1Q. Identifier information used in this embodiment of the present invention may not be limited to an sVlan. In addition, such as PWE3 (Pseudo-Wire Emulation Edge to Edge, pseudo wire emulation edge-to-edge technology) and PVC (Permanent Virtual Connection, permanent virtual connection, ATM technology) may be used as the user group identifier information. The present invention is not limited thereto.

By means of the method for managing an address resource according to this embodiment of the present invention, in a process of allocating an address by a gateway device, a delegated address is allocated only to a user terminal in a same user group, thereby effectively managing and allocating the address resource, and reducing occurrence of a situation in which multiple user groups share a same address pool. Therefore, horizontal traffic is reduced, requirements of horizontal tunnels are reduced for the gateway device, port resources between gateway devices are saved, and system performance is improved.

Embodiment 2

In an embodiment, an address pool may be a segment of consecutive public network addresses. Generally, a network operator needs to buy multiple address pools to ensure that sufficient public network addresses are available for allocation to users. For example:

The address pool bought by the operator includes consecutive public network addresses in network segment C. Table 1 lists a situation in which the operator allocates address pools (that is, all address pools managed by a management gateway device in one gateway group) to one gateway group, where C indicates a capacity unit of an address pool in network segment C. Generally, one C indicates 256 consecutive public network addresses in network segment C. For example, the size of one address pool is 0.5 C, indicating that the address pool includes 128 consecutive public network addresses. As shown in Table 1, address pools managed by one management gateway device are classified into 4 types in size, where 240 address pools (each includes 128 consecutive public network addresses) are 0.5 C in size, accounting for 62% of the total number of address pools managed by the management gateway device, 80 address pools (each includes 512 consecutive public network addresses) are 2 C in size, accounting for 20% of the total number of address pools managed by the management gateway device, 50 address pools (each includes 1024 consecutive public network addresses) are 4 C in size, accounting for 13% of the total number of address pools managed by the management gateway device, and 20 address pools (each includes 2048 consecutive public network addresses) are 8 C in size, accounting for 5% of the total number of address pools managed by the management gateway device.

TABLE 1

| Address pool size | Number | Relative percentage |
|---|---|---|
| 0.5C | 240 | 62% |
| 2C | 80 | 20% |

TABLE 1-continued

| Address pool size | Number | Relative percentage |
|---|---|---|
| 4C | 50 | 13% |
| 8C | 20 | 5% |

Specifically, in an embodiment, a management gateway device may use 5% to 10% of all address pools managed by it as shared address pools to provide them for multiple gateway devices, and use the remaining 90% to 95% of the address pools as exclusive address pools that are delegated to a gateway device. The proportion of the shared address pools to the exclusive address pools may be adjusted according to a specific application environment. An implementation manner of dividing address pools into shared address pools and exclusive address pools may be any implementation manner familiar to a person skilled in the art, and this is not limited herein. An exclusive address pool may be delegated by the management gateway device to a gateway device in a gateway group, so that the delegated gateway device allocates an address in the exclusive address pool to a user terminal in a same user group corresponding to the gateway device, that is, one exclusive address pool corresponds only to one user group; for a shared address pool, an address in the shared address pool may be allocated by the management gateway device to multiple different gateway devices in a gateway group, so that the different gateway devices further allocate the address, which is allocated by the management gateway device, to a user terminal in a user group corresponding to each gateway device, that is, an address in one shared address pool may be allocated to user terminals in different user groups. When the address in the shared address pool is allocated, because the management gateway device releases an address pool route for the shared address pool and another gateway device may apply for an address resource in the shared address pool, downlink traffic (data traffic sent from an upper-layer network device to a user terminal) will arrive at the management gateway device first, then the management gateway device needs to forward this part of traffic to the gateway device, and the gateway device sends the traffic to a user side over a found host route of a local user terminal. Forwarding from the management gateway device to the gateway device may be implemented by means of a tunnel technology, that is, by establishing a horizontal tunnel between different gateway devices. For example, as shown in FIG. 2, the gateway device 1 is the management gateway device, and the gateway device 2 is the gateway device applying for a resource in a shared address pool. Because the gateway device 1 managing the shared address pool releases an address pool route for the shared address pool and the gateway device 2 applying for the address resource is another gateway device, downlink traffic will arrive at the gateway device 1 first, then the gateway device 1 needs to forward this part of traffic to the gateway device 2 through a horizontal tunnel, and the gateway device 2 sends the traffic to a user terminal over a found host route of a local user. An implementation manner of establishing a horizontal tunnel between different gateway devices may be any implementation manner familiar to a person skilled in the art, and this is not limited herein.

In this embodiment, the management gateway device manages the shared address pools, so that utilization of address resources can be improved under a situation in which loads in the entire gateway group are high. Because the shared address pools occupy a relatively small proportion of all address pools and the shared address pools are used only when address resources in all exclusive address pools are used up, horizontal traffic in a practical application is far less than that in the solution in the prior art.

Figure 3A:
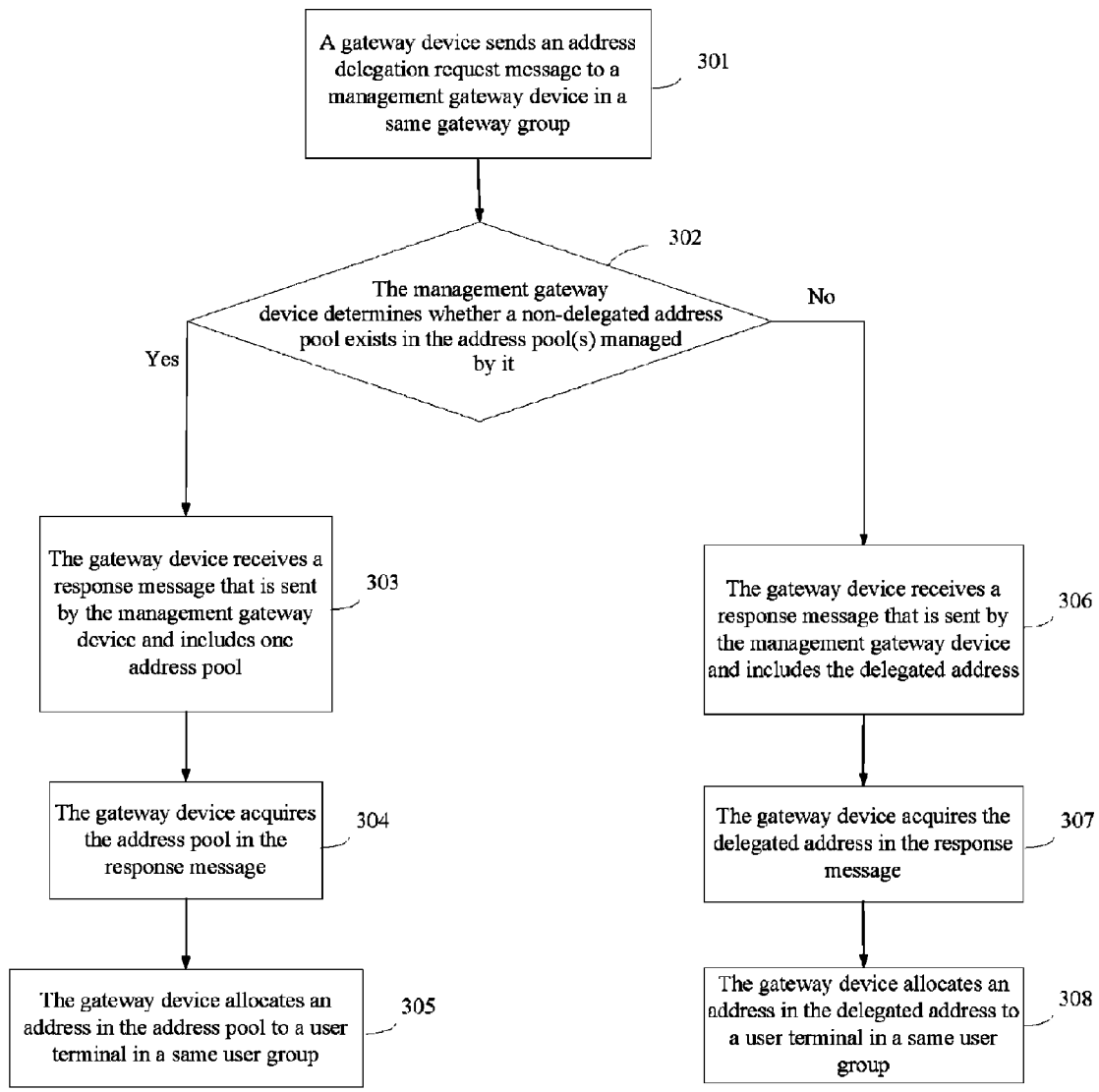
FIG. 3a is a flowchart of a method for managing an address resource according to Embodiment 2 of the present invention.

This embodiment of the present invention provides a method for managing an address resource. As shown in FIG. 3a, which further extends the method for managing an address resource shown in FIG. 1, the method includes:

Step 301: A gateway device sends an address delegation request message to a management gateway device in a same gateway group.

The management gateway device is configured to manage an address pool(s) or an address in an address pool. The address delegation request message is used to request the management gateway device to delegate the address pool(s) managed by it or the address in the address pool to the gateway device, which sends the address delegation request message, for management. Optionally, the address delegation request message sent by the gateway device may further include information about the number of addresses. Under this situation, if a non-delegated address pool exists in the address pool(s) managed by the management gateway device, the management gateway device does not consider the information about the number of addresses that is carried in the address delegation request message. The management gateway device considers whether the information about the number of addresses is carried in the address delegation request message only when a non-delegated address pool does not exist in the address pool(s) managed by the management gateway device.

In this embodiment, a manner of managing the address pool(s) or the address in the address pool by the management gateway device may be: allocating a delegated address to the gateway device according to the address delegation request message and sending a response message including the delegated address to the gateway device.

Further, the address delegation request message further includes user group identifier information, so that the management gateway device records, according to the user group identifier information, correspondence between the delegated address and a user group that is specified by the user group identifier information. In this embodiment, after acquiring the user group identifier information from the address delegation request message sent by the gateway device, the management gateway device may optimize a policy for managing an address pool(s). For example, in a practical application of the present invention, Internet surfing frequency is different for user terminals in different user groups. For example, both user group A and user group B have 1000 user terminals. According to statistics, at most 1000 user terminals in user group A are online at the same time, and at most 400 user terminals in user group B are online at the same time. Because a situation in which multiple independent address pools are concurrently provided for one user group (that is, multiple independent address pools are delegated to a same gateway device) exists, for the purpose of saving address resources, the management gateway device may record a user group corresponding to each delegated independent address pool according to the user group identifier information in the address delegation request message sent by the gateway device, so that independent address pools provided for user group B can be reduced by a method of setting an upper limit on the number. For example, the maximum number of independent address pools delegated by the management gateway device to a gateway device corresponding to user group A is 10, and the maximum number of independent address pools delegated to a gateway device corresponding to user group B is 5. A specific implementation manner of optimizing, according to the user group identifier information, the policy for managing the address pool(s) may be any implementation manner familiar to a person skilled in the art, and this is not limited herein.

Step 302: The management gateway device determines whether a non-delegated address pool exists in the address pool(s) managed by it.

Specifically, in this embodiment, all address pools managed by the management gateway device may be divided into shared address pools and exclusive address pools, and the management gateway device determines whether a non-delegated exclusive address pool exists in the address pool(s) managed by it. The exclusive address pool is used to be delegated to a certain gateway device, so that the gateway device to which the exclusive address pool is delegated allocates an address in the exclusive address pool to a user terminal in a same user group corresponding to the gateway device, that is, each exclusive address pool delegated by the management gateway device to the gateway device corresponds only to one user group (the address in the exclusive address pool can be allocated only to a user terminal in one user group). After receiving the address delegation request message sent by the gateway device, the management gateway device determines whether an idle exclusive address pool (that is, an exclusive address pool that is not delegated to the gateway device) exists in the address pool(s) managed by the management gateway device.

If the management gateway device determines that a non-delegated exclusive address pool exists in the address pool(s) managed by the management gateway device, a procedure from step 303 to step 305 is performed; if the management gateway device determines that a non-delegated exclusive address pool does not exist in the address pool(s) managed by the management gateway device, a procedure from step 306 to step 308 is performed.

Step 303: The gateway device receives a response message that is sent by the management gateway device and includes one address pool.

Specifically, in this embodiment, after sending the address delegation request message to the management gateway device, the gateway device receives the response message sent by the management gateway device, where the response message includes one exclusive address pool, and under this situation, the delegated address includes all addresses in the exclusive address pool.

Further, optionally, the exclusive address pool included in the response message may be an exclusive address pool selected, by the management gateway device according to a preset rule, from all non-delegated exclusive address pools that are managed by the management gateway device. For example, the management gateway device may select the smallest address pool from all the non-delegated address pools that are managed by it, that is, after receiving the address delegation request message sent by the gateway device, the management gateway device first acquires the address pool having the fewest addresses from all non-delegated address pools, and then sends a response message that includes the address pool having the fewest addresses to the gateway device.

Step 304: The gateway device acquires the address pool in the response message.

Specifically, in this embodiment, after receiving the response message that is sent by the management gateway device and includes one exclusive address pool, the gateway device acquires the exclusive address pool in the response message.

Step 305: The gateway device allocates an address in the address pool to a user terminal in a same user group.

Specifically, in this embodiment, the gateway device allocates an address in the exclusive address pool to the user terminal in the same user group. The gateway device may allocate the address to the user terminal in the same user group in various manners. For example, a general process of allocating the address to the user terminal by the gateway device is as follows: A user terminal of a broadband-access user may request address allocation by using DHCP (Dynamic Host Configuration Protocol, Dynamic Host Configuration Protocol); each gateway device in a gateway group specifies, in a static or dynamic negotiation manner, that one gateway device is responsible for processing access of a user group to which the user belongs and allocating an address to a user terminal in the user group. Alternatively, the user terminal may access a network in a PPPOE (point to point protocol over Ethernet, Point-to-Point Protocol over Ethernet) manner; at an NCP (Network Core Protocol, Network Core Protocol) stage of PPP (Point to Point Protocol, Point-to-Point Protocol), a gateway device corresponding to the user group in which the user terminal exists allocates the address.

Further, optionally, before allocating the address to the user terminal, the gateway device may select, according to a preset rule, an exclusive address pool from all exclusive address pools delegated to the gateway device and then allocate an address in the selected exclusive address pool to the user terminal. For example, the gateway device may select an exclusive address pool having the largest number of addresses and preferentially allocate an address in the exclusive address pool having the largest number of addresses to the user terminal in the user group. In a practical application, a situation in which multiple exclusive address pools are concurrently provided for a same user group (that is, multiple exclusive address pools are delegated to a gateway device corresponding to the user group) may occur. When a user terminal in a user group goes online, the address in the exclusive address pool having the largest number of addresses is preferentially allocated, thereby preventing allocating an address in an exclusive address pool having fewer addresses. As time goes by, user terminals in a same user group to which the addresses in the address pool having fewer addresses are allocated will go offline gradually, and return the occupied addresses to the exclusive address pool to which the addresses belong. When all user terminals for which a certain exclusive address pool is provided go offline, the exclusive address pool regains all allocated addresses. At this time, the gateway device may return the exclusive address pool to the management gateway device, so that the management gateway device reallocates the exclusive address pool, which is returned by the gateway device, to another gateway device.

Step 306: The gateway device receives a response message that is sent by the management gateway device and includes the delegated address.

When the address delegation request message does not include the information about the number of addresses and a non-delegated address pool does not exist in the address pool(s) managed by the management gateway device, the management gateway device may delegate, according to a certain policy, a certain number of addresses to the gateway device that sends the address delegation request message.

When the address delegation request message further includes the information about the number of addresses and a non-delegated address pool does not exist in the address pool(s) managed by the management gateway device, addresses whose number is specified by the information about the number of addresses are sent to the gateway device by using the response message, that is, the delegated address is the addresses whose number is specified by the information about the number of addresses.

Specifically, in this embodiment, the gateway device receives the response message that is sent by the management gateway device and includes an address in a shared address pool. The address allocated to the gateway device comes from the shared address pool managed by the management gateway device. The management gateway device does not delegate the shared address pool to the gateway device but provides it for multiple gateway devices for use at the same time. In this embodiment, because each exclusive address pool can be provided only for one user group, as the entire system operates, a situation in which all exclusive address pools are delegated to the gateway device may occur. As a result, the management gateway device has no exclusive address pool for delegation. For example, as shown in FIG. 2, at this time, if the gateway device 2 receives address application information (such as an ARP (Address Resolution Protocol, Address Resolution Protocol) packet for a new user to request the gateway device to allocate an address when accessing a network) of a user terminal in a user group corresponding to the gateway device 2, and all addresses in an exclusive address pool delegated to the gateway device 2 have been allocated to user terminals in the user group, the gateway device 2 still sends an address delegation request message to the management gateway device. If the address delegation request message does not include the information about the number of addresses, the gateway device 1 (management gateway device) acquires at least one address as the delegated address from the shared address pool managed by it; if the address delegation request message includes the information about the number of addresses, the gateway device 1 (management gateway device) acquires, from the shared address pool managed by it, addresses whose number is specified by the information about the number of addresses, uses them as the delegated addresses and sends the delegated addresses carried in the response message to the gateway device 2, so that the gateway device 2 allocates an address in the delegated addresses to a user terminal that newly applies for a network connection.

Step 307: The gateway device acquires the delegated address in the response message.

Specifically, in this embodiment, the gateway device acquires the delegated address from the response message, so that the gateway device allocates an address in the delegated address to a user terminal in a user group. The delegated address may be at least one address delegated by the management gateway device or addresses whose number is specified by the information about the number of addresses in the address delegation request message.

Step 308: The gateway device allocates an address in the delegated address to a user terminal in a same user group.

The method for managing an address resource according to this embodiment of the present invention can enable an address in each delegated address pool to be allocated only to a user terminal in one user group corresponding to the address pool, thereby reducing occurrence of a situation in which multiple user groups share a same address pool, reducing horizontal traffic, and saving valuable bandwidth resources and interface resources; further, in a situation in which all address pools that can be delegated are occupied, part of address pools can be provided for multiple user groups for sharing, thereby further improving utilization of address resources and improving system performance; still further, an address management policy can be further optimized according to user group identifier information.

Figure 3B:
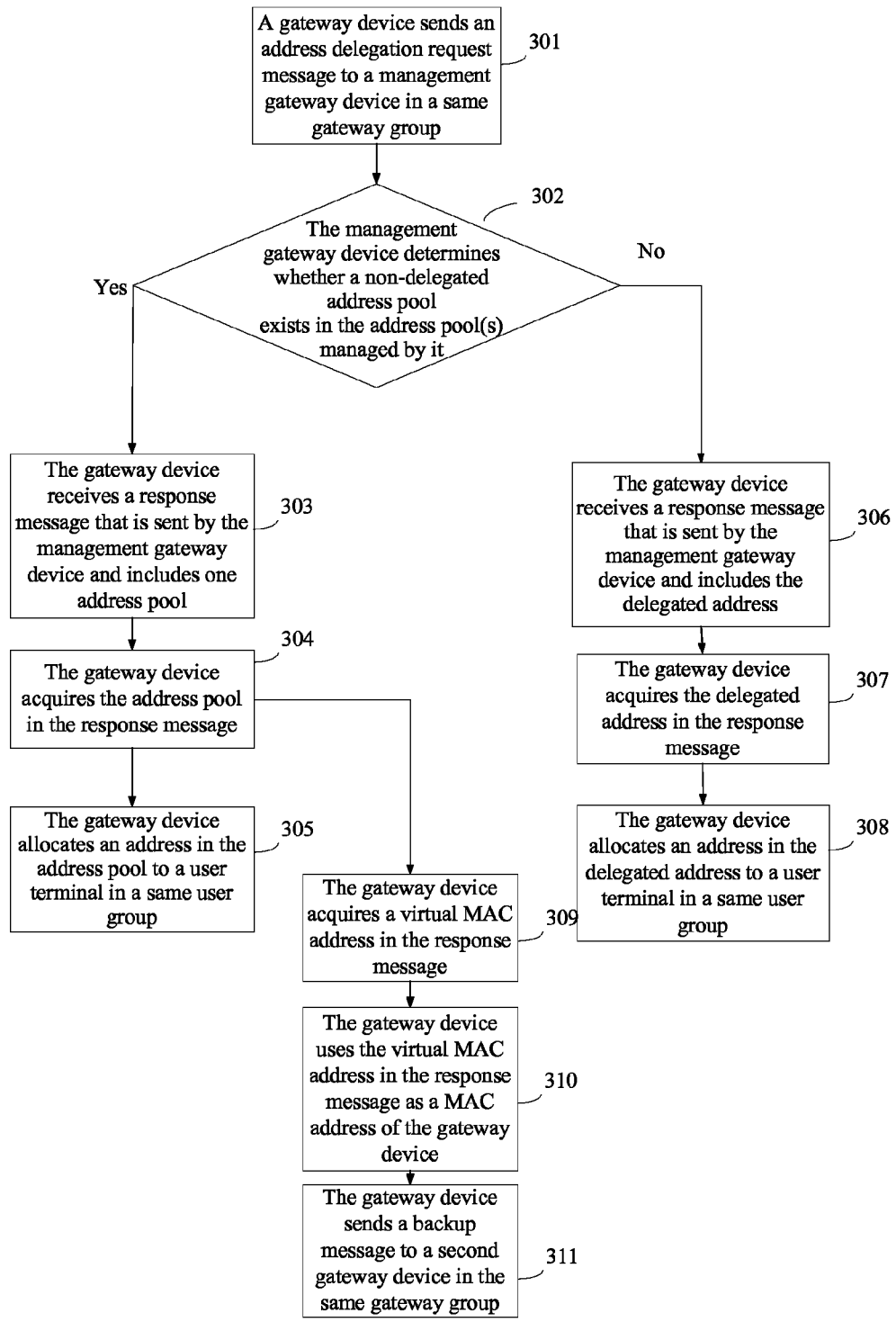
FIG. 3b is a flowchart of a method for managing an address resource according to Embodiment 2 of the present invention.

Further, optionally, the management gateway device may further carry a virtual MAC address in the response message, where the virtual MAC address is to be allocated to the gateway device. Based on the method shown in FIG. 3a, as shown in FIG. 3b, after step 304, this embodiment of the present invention may further include:

Step 309: The gateway device acquires the virtual MAC address in the response message.

Specifically, in this embodiment, the response message received by the gateway device further includes the virtual MAC address, and the gateway device may use the acquired virtual MAC address as a MAC address of the gateway device. When a user terminal is ready to access a network, an ARP request is sent to a gateway device, and a gateway device responsible for access of the user terminal replies an ARP response message to the user terminal, where the ARP response message includes a virtual MAC address of the gateway device.

Step 310: The gateway device uses the virtual MAC address in the response message as a MAC address of the gateway device.

Step 311: The gateway device sends a backup message to a second gateway device in the same gateway group.

The second gateway device is any other gateway device in the same gateway group as the gateway device.

The backup message includes the address pool and the virtual MAC address, so that the second gateway device acquires the address pool according to the backup message and uses the virtual MAC address as a MAC address of a gateway device corresponding to the address pool.

Specifically, in this embodiment, after receiving the response message sent by the management gateway device, the gateway device sends the backup message to the second gateway device in the same gateway group. In a practical application, under some situations, a user group needs to switch the gateway device. In this case, an address pool delegated to an original gateway device needs to be transferred to another gateway device in a same gateway group, so that the another gateway device continues to serve a user terminal in the user group. For example, after receiving an ARP request sent by a user terminal in a user group managed by the gateway device, the gateway device uses a virtual MAC address as a MAC address on a physical port of the gateway device and sends the MAC address to the user terminal by using an ARP response. Then, the user terminal may use the virtual MAC address as a destination address of sent information (such as an ARP packet). In this way, when the user group switches from the original gateway device to a new gateway device, because the new gateway device still uses a virtual MAC address of the original gateway device as a MAC address of a physical port of the new gateway device, the user terminal in the user group can perform information exchange (such as sending an ARP packet) with the new gateway device by using the virtual MAC address of the original gateway device, so that the user terminal does not need to change the recorded destination address in the process of switching the gateway device (that is, the virtual MAC address of the original gateway device is unchanged). Therefore, a packet that needs to be sent from an uplink device (such as the original gateway device or the new gateway device switched from the original gateway device) to the user terminal during gateway device switching, so as to update the MAC address in the prior art is eliminated, thereby reducing occupancy of system channel traffic and improving system performance.

By means of the method for managing an address resource according to this embodiment of the present invention, a virtual address is used to prevent updating address information of a gateway device in a user terminal when a user group switches between different gateway devices, thereby reducing occupancy of channel traffic between the user terminal and an uplink device that is resulted from update information transmission and improving system performance.

Embodiment 3

Figure 4:
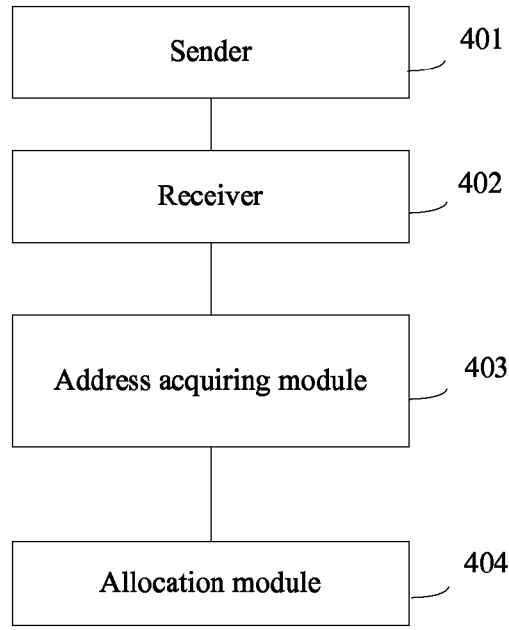
FIG. 4 is a schematic structural diagram of a gateway device for managing an address resource according to Embodiment 3 of the present invention.

This embodiment of the present invention provides a gateway device for managing an address resource, configured to implement the method shown in FIG. 1. As shown in FIG. 4, the gateway device includes: a sender 401, a receiver 402, an address acquiring module 403, and an allocation module 404, where:

The sender 401 is configured to send an address delegation request message to a management gateway device in a same gateway group.

The management gateway device is configured to manage an address pool(s) or an address in an address pool.

The receiver 402 is configured to receive a response message sent by the management gateway device.

The response message includes a delegated address, and the delegated address is an address in the address pool(s) managed by the management gateway device.

The address acquiring module 403 is configured to acquire the delegated address in the response message.

The allocation module 404 is configured to allocate an address in the delegated address to a user terminal in a same user group.

By means of the gateway device for managing an address resource according to this embodiment of the present invention, in a process of allocating an address by the gateway device using an allocator, a delegated address is allocated only to a user terminal in a same user group, thereby effectively managing and allocating the address resource, and reducing occurrence of a situation in which multiple user groups share a same address pool. Therefore, horizontal traffic is reduced, requirements of horizontal tunnels are reduced for the gateway device, port resources between gateway devices are saved, and system performance is improved.

Embodiment 4

Figure 5A:
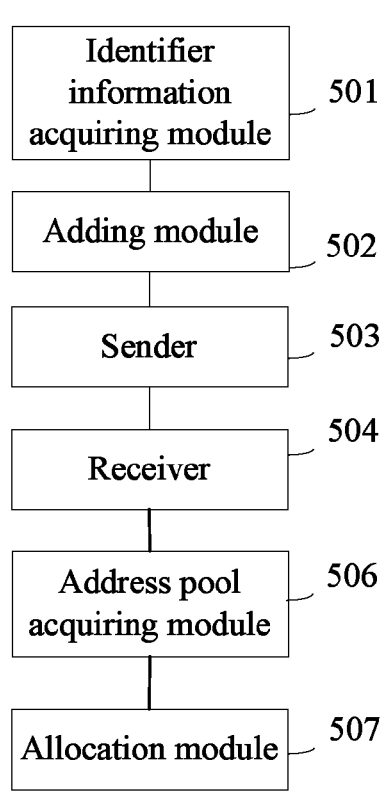
FIG. 5a is a schematic structural diagram of a gateway device for managing an address resource according to Embodiment 4 of the present invention.

This embodiment of the present invention provides a gateway device for managing an address resource, which is obtained by means of extension based on the embodiment shown in FIG. 4 and configured to implement the method shown in FIG. 3. As shown in FIG. 5a, the gateway device includes: an identifier information acquiring module 501, an adding module 502, a sender 503, a receiver 504, an address acquiring module 505, an address pool acquiring module 506, and an allocation module 507, where:

The identifier information acquiring module 501 is configured to acquire user group identifier information, where the user group identifier information corresponds to an accessed user group.

The adding module 502 is configured to add the user group identifier information to an address delegation request message, so that a management gateway device records, according to the user group identifier information, correspondence between a delegated address and a user group specified by the user group identifier information.

The identifier information acquiring module 501 and the adding module 502 are optional functions of the gateway device.

The sender 503 is configured to send the address delegation request message to the management gateway device in a same gateway group, where the management gateway device is configured to manage an address pool(s) or an address in an address pool.

Optionally, the address delegation request message includes information about the number of addresses, so that the management gateway device adds addresses whose number is specified by the information about the number of addresses, to a response message.

The receiver 504 is configured to receive the response message sent by the management gateway device.

The response message includes a delegated address, and the delegated address is an address in the address pool(s) managed by the management gateway device.

Specifically, when a non-delegated address pool exists in the address pool(s) managed by the management gateway device, the delegated address(s) is an address in one address pool; when a non-delegated address pool does not exist in the address pool(s) managed by the management gateway device and the address delegation request message does not include the information about the number of addresses, the delegated address is at least one address delegated by the management gateway device according to a certain rule; when a non-delegated address pool does not exist in the address pool(s) managed by the management gateway device and the address delegation request message includes the information about the number of addresses, the delegated address includes addresses whose number is specified by the information about the number of addresses.

The address acquiring module 505 is configured to acquire the delegated address in the response message. The allocation module 507 is configured to allocate the at least one delegated address to a user terminal in a same user group.

Specifically, the allocation module 507 is configured to allocate an address in an address pool included in the response message to the user terminal in the same user group, an address in at least one address in the response message, or an address in the addresses whose number is specified in the response message.

The gateway device for managing an address resource according to this embodiment of the present invention can enable an address in each delegated address pool to be allocated only to a user terminal in a user group corresponding to the address pool, thereby reducing occurrence of a situation in which multiple user groups share a same address pool, reducing horizontal traffic, and saving valuable bandwidth resources and interface resources; further, in a situation in which all address pools that can be delegated are occupied, part of address pools can be provided for multiple user groups for sharing, thereby further improving utilization of address resources and improving system performance; still further, an address management policy can be further optimized according to user group identifier information.

Figure 5B:
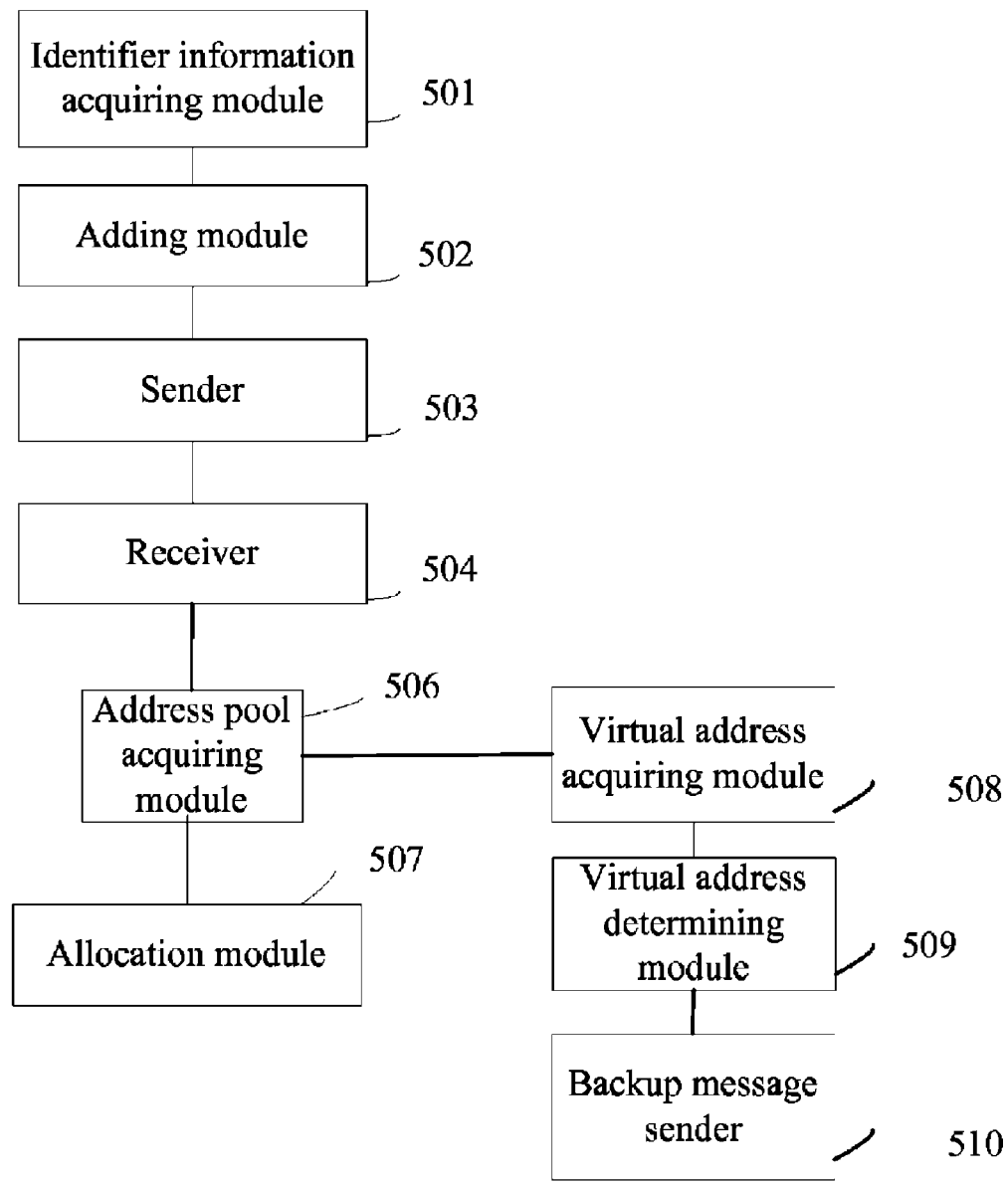
FIG. 5b is a schematic structural diagram of a gateway device for managing an address resource according to Embodiment 4 of the present invention.

Further, optionally, as shown in FIG. 5*b*, the gateway device further includes: a virtual address determining module 509, a virtual address acquiring module 508, and a backup message sender 510, where:

the virtual address acquiring module 508 is configured to, when the delegated address acquired by the address acquiring module is an address pool, acquire a virtual MAC address in the response message, where the virtual MAC address is allocated by the management gateway device to the gateway device.

the virtual address determining module 509 is configured to use the virtual MAC address in the response message as a MAC address of the gateway device.

the backup message sender 510 is configured to send a backup message to a second gateway device in a same gateway group.

The backup message includes the address pool and the virtual MAC address, so that the second gateway device acquires the address pool according to the backup message and uses the virtual MAC address as a MAC address of a gateway device corresponding to the address pool, and the second gateway device is any other gateway device in the same gateway group as the gateway device.

The gateway device in this embodiment of the present invention and the foregoing method embodiments of the present invention belong to a same conception. For content that is not described in detail in the embodiment about the gateway device, reference may be made to the descriptions in the method embodiments of the present invention.

The gateway device according to this embodiment of the present invention can use a virtual address to prevent updating address information of a gateway device in a user terminal when a user group switches between different gateway devices, thereby reducing occupancy of channel traffic between the user terminal and an uplink device that is resulted from update information transmission and improving system performance.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may include: a magnetic disc, an optical disc, a read-only memory (Read-Only Memory, ROM), or a random access memory (Random Access Memory, RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for managing an address resource, comprising:

receiving, by a first gateway device, a connection request from a user terminal;

sending, by the first gateway device, an address delegation request message to a management gateway device in a same gateway group as the first gateway device, wherein the management gateway device is configured to manage one or more address pools, and each address pool comprises one or more addresses;

receiving, by the first gateway device, a response message sent by the management gateway device, wherein the response message comprises a delegated address pool comprising one or more delegated addresses managed by the management gateway device;

acquiring, by the first gateway device, the delegated address pool in the response message; and allocating, by the first gateway device, one of the one or more delegated addresses in the delegated address pool to the user terminal in a user group to identify the user terminal;

wherein the first gateway device is configured to connect the user terminal to an external destination via only the first gateway device of the gateway group.

2. The method for managing an address resource according to claim 1, wherein the address delegation request message comprises information about the number of addresses, and when a non-delegated address pool does not exist in the one or more address pools managed by the management gateway device, the delegated address pool comprises addresses whose number is designated by the information about the number of addresses.

3. The method for managing an address resource according to claim 1, wherein the address delegation request message further comprises identifier information of the user group, so that the management gateway device records, according to the identifier information of the user group, correspondence between the delegated address pool and the user group designated by the identifier information of the user group.

4. The method for managing an address resource according to claim 1, wherein the acquiring, by the first gateway device, the delegated address pool in the response message comprises:

acquiring, by the first gateway device, from all address pools delegated by the management gateway device to the first gateway device, the delegated address pool that has the largest number of addresses; and wherein allocating, by the first gateway device, the one of the one or more delegated addresses in the delegated address pool to the user terminal in the user group comprises:

allocating, by the first gateway device, the one of the one or more delegated addresses in the delegated address pool that has the largest number of addresses to the user terminal in the user group.

5. The method for managing an address resource according to claim 1, wherein the response message further comprises a virtual MAC address, and the method further comprises:

acquiring, by the first gateway device, the virtual MAC address in the response message; and using, by the first gateway device, the virtual MAC address in the response message as a MAC address of the first gateway device.

6. The method for managing an address resource according to claim 5, wherein after the receiving a response message sent by the management gateway device, the method further comprises:

sending, by the first gateway device, a backup message to a second gateway device in the same gateway group, wherein the backup message comprises the delegated address pool and the virtual MAC address so that the second gateway device acquires the delegated address pool according to the backup message and uses the virtual MAC address as a MAC address of the first gateway device, and the second gateway device is any other gateway device in the same gateway group as the first gateway device.

7. A gateway device for managing an address resource, comprising:

a memory storing instructions; and a processor coupled to the memory to execute the instructions to:

receive a connection request from a user terminal;

send an address delegation request message to a management gateway device in a same gateway group as the gateway device, wherein the management gateway device is configured to manage one or more address pools, and each address pool comprises one or more addresses;

receive a response message sent by the management gateway device, wherein the response message comprises a delegated address pool comprising one or more delegated addresses managed by the management gateway device;

acquire the delegated address pool in the response message; and allocate one of the one or more delegated addresses in the delegated address pool to the user terminal in a user group to identify the user terminal;

wherein the gateway device is configured to connect the user terminal to an external destination via only the gateway device of the gateway group.

8. The gateway device for managing an address resource according to claim 7, wherein the address delegation request message comprises information about the number of addresses, and when a non-delegated address pool does not exist in the one or more address pools managed by the management gateway device, the delegated address pool comprises addresses whose number is designated by the information about the number of addresses.

9. The gateway device for managing an address resource according to claim 7, wherein the address delegation request message further comprises identifier information of the user group, so that the management gateway device records, according to the identifier information of the user group, correspondence between the delegated address pool and the user group designated by the identifier information of the user group.

10. The gateway device for managing an address resource according to claim 7, wherein the instructions executed by the processor instruct the processor to: acquire, from all address pools delegated by the management gateway device to the gateway device, the delegated address pool that has the largest number of addresses, and allocate the one of the one or more delegated addresses in the delegated address pool that has the largest number of addresses to the user terminal in the user group.

11. The gateway device for managing an address resource according to claim 7, wherein the response message further comprises a virtual MAC address, and the instructions executed by the processor further instruct the processor to:

acquire the virtual MAC address in the response message; and use the virtual MAC address in the response message as a MAC address of the gateway device.

12. The gateway device for managing an address resource according to claim 11, wherein the instructions executed by the processor further instruct the processor to:

send a backup message to another gateway device in the same gateway group, wherein the backup message comprises the delegated address pool and the virtual MAC address so that the another gateway device acquires the delegated address pool according to the backup message and uses the virtual MAC address as a MAC address of the gateway device, and the another gateway device is any other gateway device in the same gateway group as the gateway device.

\* \* \* \* \*